(12) United States Patent
Kadota

(10) Patent No.: US 10,191,706 B2
(45) Date of Patent: *Jan. 29, 2019

(54) COMMUNICATION APPARATUS, CONTROL METHOD, AND STORAGE MEDIUM

(71) Applicant: CANON KABUSHIKI KAISHA, Tokyo (JP)

(72) Inventor: Eiji Kadota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,649

(22) Filed: Aug. 25, 2017

(65) Prior Publication Data

US 2017/0351469 A1 Dec. 7, 2017

Related U.S. Application Data

(63) Continuation of application No. 15/216,526, filed on Jul. 21, 2016, now Pat. No. 9,778,891, which is a continuation of application No. 14/706,805, filed on May 7, 2015, now Pat. No. 9,430,175.

(30) Foreign Application Priority Data

May 13, 2014 (JP) ................. 2014-099838

(51) Int. Cl.
*G06F 3/12* (2006.01)
*H04N 1/00* (2006.01)
*H04W 4/80* (2018.01)
*H04W 88/06* (2009.01)

(52) U.S. Cl.
CPC .......... *G06F 3/1292* (2013.01); *G06F 3/1236* (2013.01); *G06F 3/1238* (2013.01); *G06F 3/1286* (2013.01); *H04N 1/00214* (2013.01); *H04W 4/80* (2018.02); *H04W 88/06* (2013.01)

(58) Field of Classification Search
USPC ....................................... 358/1.15
See application file for complete search history.

(56) References Cited

U.S. PATENT DOCUMENTS

| | | | | |
|---|---|---|---|---|
| 2008/0036056 A1* | 2/2008 | Joshi | .................. | H01L 23/3121 257/676 |
| 2009/0103124 A1* | 4/2009 | Kimura | ................. | G06F 3/1204 358/1.15 |
| 2013/0231051 A1* | 9/2013 | Naruse | ................. | G06F 3/1204 455/41.2 |

* cited by examiner

*Primary Examiner* — Ngon Nguyen
(74) *Attorney, Agent, or Firm* — Canon USA Inc., IP Division

(57) ABSTRACT

A communication apparatus including a near field wireless communication unit which holds communication information regarding a communication sets a communication mode to be used for a wireless communication unit supporting a longer field wireless communication than a wireless communication using a near field wireless communication unit in accordance with write information written from an external apparatus to the near field wireless communication unit.

24 Claims, 13 Drawing Sheets

FIG. 8

| |
|---|
| FF-EE-DD-CC-BB-AA (MAC ADDRESS) |
| 123456789 (SSID) |
| 192.168.0.1 (IP ADDRESS) |
| 255.255.254.0 (SUB NET MASK) |
| ... |
| ... |
| ... |

FIG. 9

| 0123456789 (AP MODE SHIFT INSTRUCTION) |
|---|
| 0000000000 |
| 0000000000 |
| 0000000000 |
| 0000000000 |
| ... |
| ... |

FIG. 10

| ADDRESS OF REGION | COMMUNICATION MODE TO BE CHANGED |
|---|---|
| 0x0000 | AP MODE |
| 0x0100 | WFD MODE |
| 0x0200 | WFDS MODE |
| ... | ... |
| ... | ... |
| ... | ... |

FIG. 13

| |
|---|
| AA-BB-CC-DD-EE-FF (WIRED LAN MAC ADDRESS) |
| 192.168.0.1 (IP ADDRESS) |
| 1 (APPARATUS DESTINATION INFORMATION) |
| AAA (MODEL NAME) |
| ... |
| ... |
| ... |

COMMUNICATION APPARATUS, CONTROL METHOD, AND STORAGE MEDIUM

CROSS-REFERENCE TO RELATED APPLICATIONS

This application is a continuation application of U.S. patent application Ser. No. 15/216,526 filed on Jul. 21, 2016 which is a continuation of U.S. application Ser. No. 14/706,805 filed on May 7, 2015 which has issued on Aug. 30, 2016 as U.S. Pat. No. 9,430,175, which claims the benefit of Japanese Patent Application No. 2014-099838, filed May 13, 2014, all of which are incorporated by reference herein in their entirety.

BACKGROUND OF THE INVENTION

Field of the Invention

The present invention relates to a communication apparatus, a control method thereof, and a storage medium and particularly relates to a communication technology allowing a near field wireless communication.

Description of the Related Art

In recent years, a system has been known which identifies a communication partner apparatus by using a near field wireless communication from an external apparatus such as a digital camera and a cellular phone and sends an image file held in the external apparatus such as a digital camera or a cellular phone by using another wireless communication different from the near field wireless communication to the identified communication partner apparatus. Examples of such a communication partner apparatus may include an image forming apparatus such as a printer.

In a case where a wireless communication such as a wireless LAN function is used, a wireless LAN is not always activated in general. For example, normally, when a USB is used, a wireless LAN is temporarily activated when it is used. Alternatively, a wireless LAN is temporarily activated when it is used in a case where the wireless LAN is activated as required only for reducing power consumption. Assuming a case where a wireless LAN function is inactivated when it is not required, a user may be required to operate an apparatus in which a wireless LAN is installed to activate the wireless LAN function again. A method has been proposed (Japanese Patent Laid-Open No. 2006-319878) which changes the activate/inactivate state of a wireless LAN function by rewriting a state flag of an RFID tag by using a near field wireless communication so that power consumption for use of a wireless LAN may be reduced without reducing usability.

However, in an example as disclosed in Japanese Patent Laid-Open No. 2006-319878, rewriting a state flag within an RFID tag is required to switch the activate/inactivate state of the wireless LAN function. In an NDEF format which is generally used for a near field communication (hereinafter, called an NFC), rewriting a specific region only is not allowed during a data writing operation, and all regions must be rewritten. Therefore, rewriting a specific state flag only is not allowed. Even in a case where the NDEF format is not used, there is a constraint that an apparatus which issues a write trigger is required to know a data structure within an RFID in order to rewrite a state flag within the RFID. As described above, in a case where an NDEF format is used or a case where a data structure within an RFID is not known, all information within an RFID tag is unintentionally rewritten by using a near field wireless communication. In other words, in a case where a processing mode of an apparatus is changed by changing data stored in an RFID tag, even information which is needed to keep by a user within the RFID tag may possibly be rewritten.

SUMMARY OF THE INVENTION

The present invention provides a communication apparatus having a near field wireless communication unit which holds communication information regarding a communication, the apparatus including a first wireless communication apparatus, a second wireless communication unit configured to allow a longer field wireless communication than the first wireless communication unit, a receiving unit configured to receive write information to be written from an external apparatus to the near field wireless communication unit, a changing unit configured to change a communication mode of the communication apparatus in accordance with the received write information, and an update unit configured to update the write information written to the near field wireless communication unit to the communication information.

Further features of the present invention will become apparent from the following description of exemplary embodiments with reference to the attached drawings.

BRIEF DESCRIPTION OF THE DRAWINGS

FIG. 8 illustrates examples of values stored in an NFC memory in the printing apparatus.

FIG. 9 illustrates examples of values to be written to the NFC memory in the printing apparatus.

FIG. 10 illustrates examples of NFC memory regions and communication modes of the printing apparatus.

FIG. 13 illustrates examples of types of information to be written to the NFC memory.

DESCRIPTION OF THE EMBODIMENTS

Exemplary embodiments of the present invention will be described in detail below with reference to drawings. However, relative positions, display screens and so on of components according to those embodiments do not intend to limit the scope of the present invention thereto otherwise specified.

First Embodiment

Figure 1:
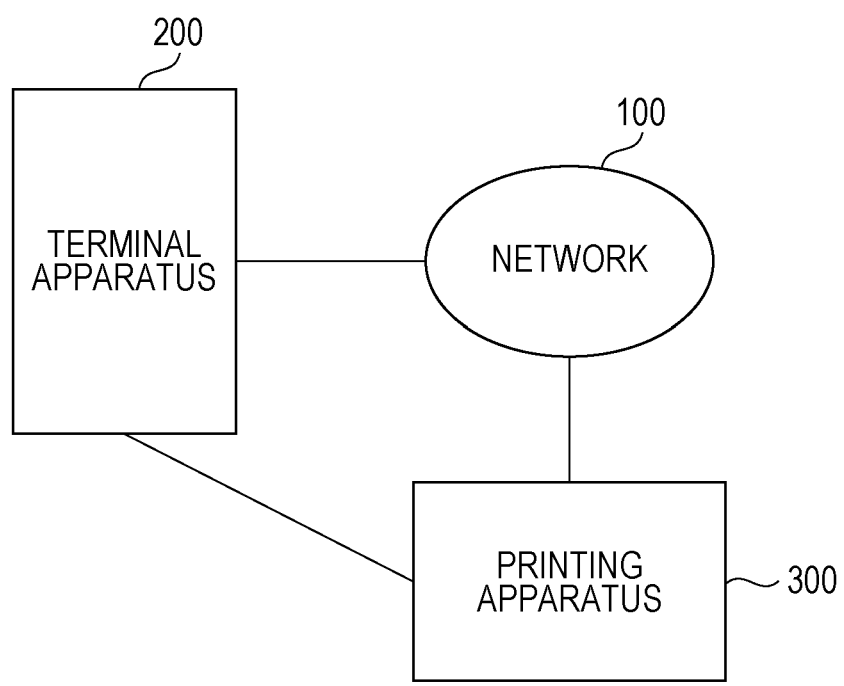
FIG. 1 illustrates an example of a configuration of a print system according to an embodiment.

FIG. 1 illustrates a configuration of a print processing system. The system includes a network 100 and a mobile terminal apparatus 200 and a printing apparatus 300 connectable to the network 100. The terminal apparatus 200 functioning as a communication apparatus has at least two types of wireless communication unit having communication speeds different from each other. The terminal apparatus 200 may be any type of apparatus as far as it is capable of handling a file to be printed, such as a personal information terminal such as a Personal Digital Assistant (PDA), a cellular phone, and a digital camera.

The printing apparatus 300 also functioning as a communication apparatus has a read function which reads a document placed on a document platen and a print function which prints by using a printing engine such as an ink jet printer and may further has a facsimile function and a telephone function.

The network 100 and the printing apparatus 300 are connected by a wired LAN or a wireless LAN. The network 100 and the terminal apparatus 200 are connected by a wireless LAN. The terminal apparatus 200 and the printing apparatus 300 are communicable by using a near field wireless communication. Because each of the terminal apparatus 200 and the printing apparatus 300 has a wireless LAN function, mutual authentication between them allows a peer-to-peer (hereinafter, P2P) communication.

Figure 2:
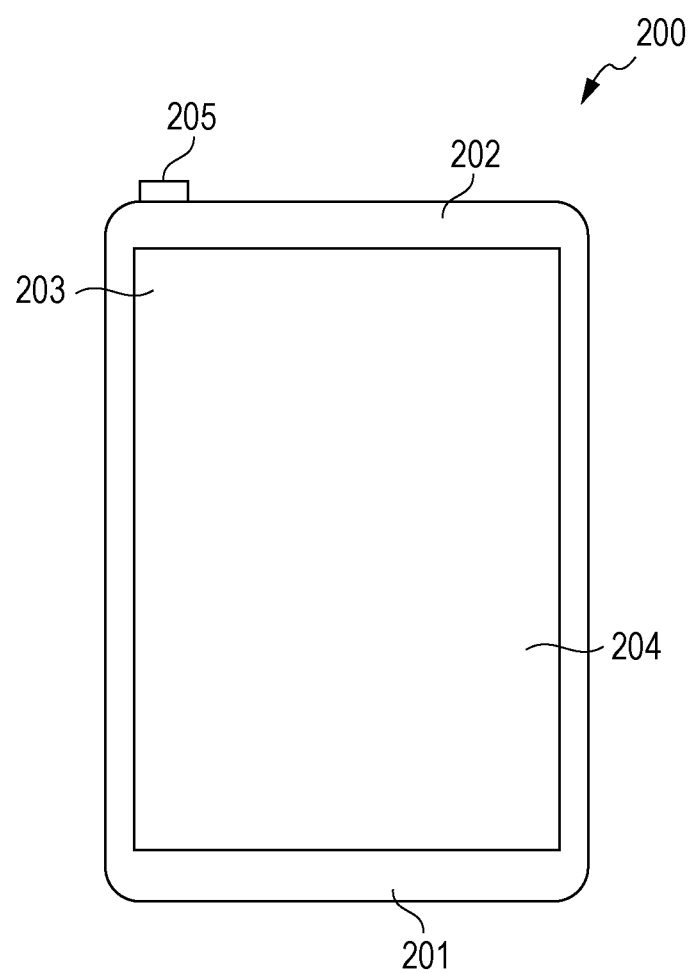
FIG. 2 illustrates an example of an outer appearance of a terminal apparatus.

FIG. 2 illustrates an outer appearance of the terminal apparatus 200. According to this embodiment, a smart phone is illustrated as an example of the terminal apparatus 200. The smart phone here is a multi-function cellular phone having a cellular phone function as well as camera, net browser and e-mail functions. A Near Field Communication (hereinafter, called an NFC) unit 201 implements a near field wireless communication. Actually, a near-field communication is implemented by bringing the NFC unit 201 closer to a range within a predetermined distance (appropriately 10 cm) from a communication partner NFC unit (of the printing apparatus 300 according to this embodiment). Such an NFC unit may sometimes be called a near field wireless communication unit.

A wireless LAN unit 202 is usable for communication over a wireless LAN and is provided within the terminal apparatus 200. A display unit 203 may include an LCD display mechanism, for example. An operation unit 204 includes a touch panel operation mechanism and detects information on a press performed by a user. According to a representative operation method, the display unit 203 displays a button icon and a software keyboard, and a user may press the operation unit 204 to issue an event that a corresponding button has been pressed. A power supply key 205 is usable for powering on and off.

Figure 3A:
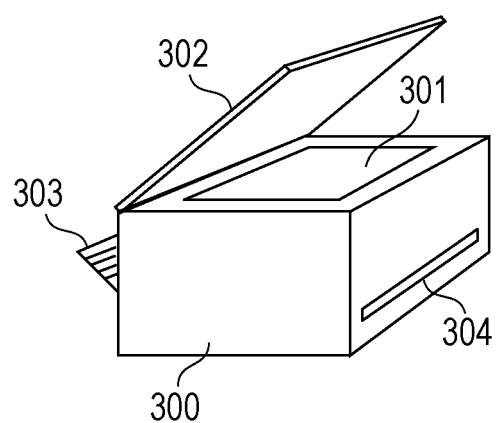
FIGS. 3A and 3B illustrate an example of an outer appearance of a printing apparatus.
Figure 3B:
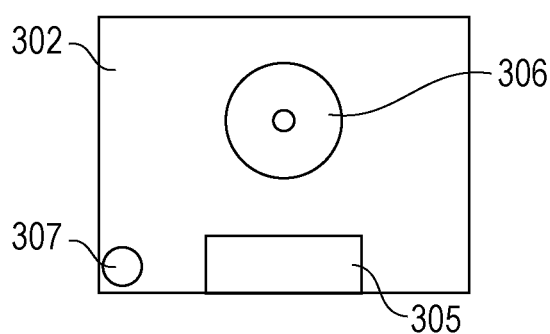

FIGS. 3A and 3B illustrate outer appearances of a printing apparatus. According to this embodiment, a Multi Function Printer (MFP) having a read function (scanner) will be described, for example. Referring to FIG. 3A, a document platen 301 is a transparent base of glass, and a document may be placed thereon to read by using a scanner. A document lid 302 is a lid for preventing reading-light from leaking to outside during a scanning operation using a scanner. Sheets having various sizes may be set to a print sheet insertion port 303. Sheets set in the print sheet insertion port 303 are conveyed to a printing part one by one, are printed, and are discharged to a print sheet ejection port 304.

Referring to FIG. 3B, an operation display unit 305 and an NFC unit 306 are provided on the document lid 302. The NFC unit 306 is a unit usable for a near field wireless communication, and the terminal apparatus 200 is brought closer to the printing apparatus 300 here. An effective contact distance is a predetermined distance (about 10 cm) from the NFC unit 306. An antenna for communication over a wireless LAN is embedded in a wireless LAN antenna 307.

A near field wireless communication refers to a wireless communication, such as an NFC, having a smaller communication range equal to a predetermined range (such as 1 m to several cm).

Figure 4:
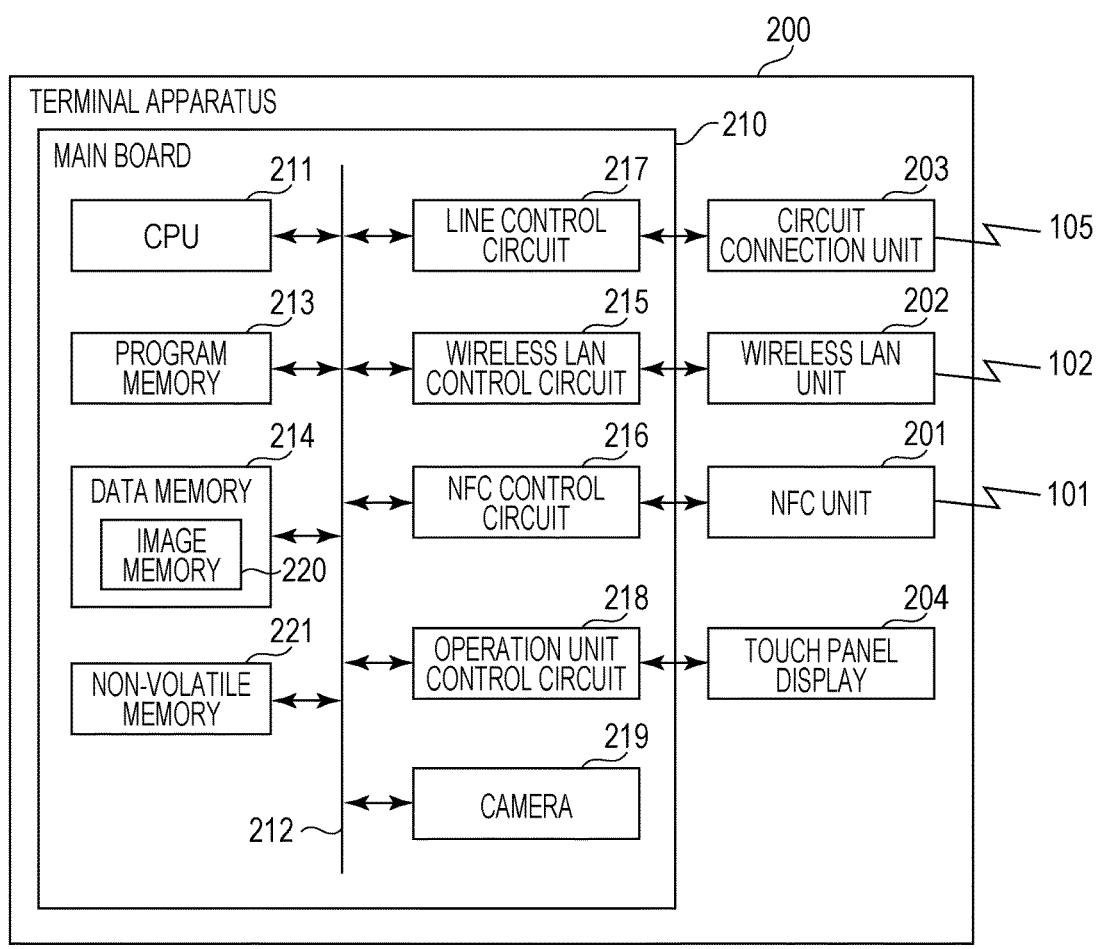
FIG. 4 is a block diagram illustrating an example of a configuration of the terminal apparatus.

FIG. 4 is a block diagram illustrating a configuration of a terminal apparatus. The terminal apparatus 200 includes a main board 210 configured to generally control the apparatus, the wireless LAN unit 202, the NFC unit 201, a line connection unit 206, the operation unit 204 and the display unit 203. Here, each of the wireless LAN unit 202, NFC unit 201, and line connection unit 206 functions as a communication unit of the terminal apparatus 200.

A CPU 211 configured as a microprocessor and provided in the main board 210 operates in accordance with a control program stored in a program memory 213 configured as a ROM and data in a data memory 214 configured as a RAM. The CPU 211, the program memory 213 and the data memory 214 are connected through an internal bus 212.

The CPU 211 controls the wireless LAN unit 202 through a wireless LAN control circuit 215 to allow communication between another communication terminal apparatus and the wireless LAN 102. The CPU 211 controls the NFC unit 201 through an NFC control circuit 216 to allow detection of a connection between another NFC terminal and the NFC 101 and transmission/reception of data to/from another NFC terminal. The CPU 211 controls the line connection unit 206 through a line control circuit 217 to allow connection to a cellular phone network 105 for calling and data exchange.

The CPU 211 controls an operation unit control circuit 218 to allow display on the operation unit 204 and reception of an operation performed by a user. The CPU 211 controls a camera 219 to allow capturing an image and stores a captured image in the image memory 220 in the data memory 214. In addition to captured images as described above, an image externally acquired through the cellular phone network 105, wireless LAN 102, or NFC 101 may be stored in the image memory 220 and may be sent to outside on the other hand.

A non-volatile memory 221 may be a memory such as a flash memory and stores data to be saved also after powered off. For example, the non-volatile memory 221 may store image data to be saved, such as telephone directory data, communication connection information, information on a device connected in the past or a program such as application software which implements a function of the terminal apparatus 200.

Figure 5:
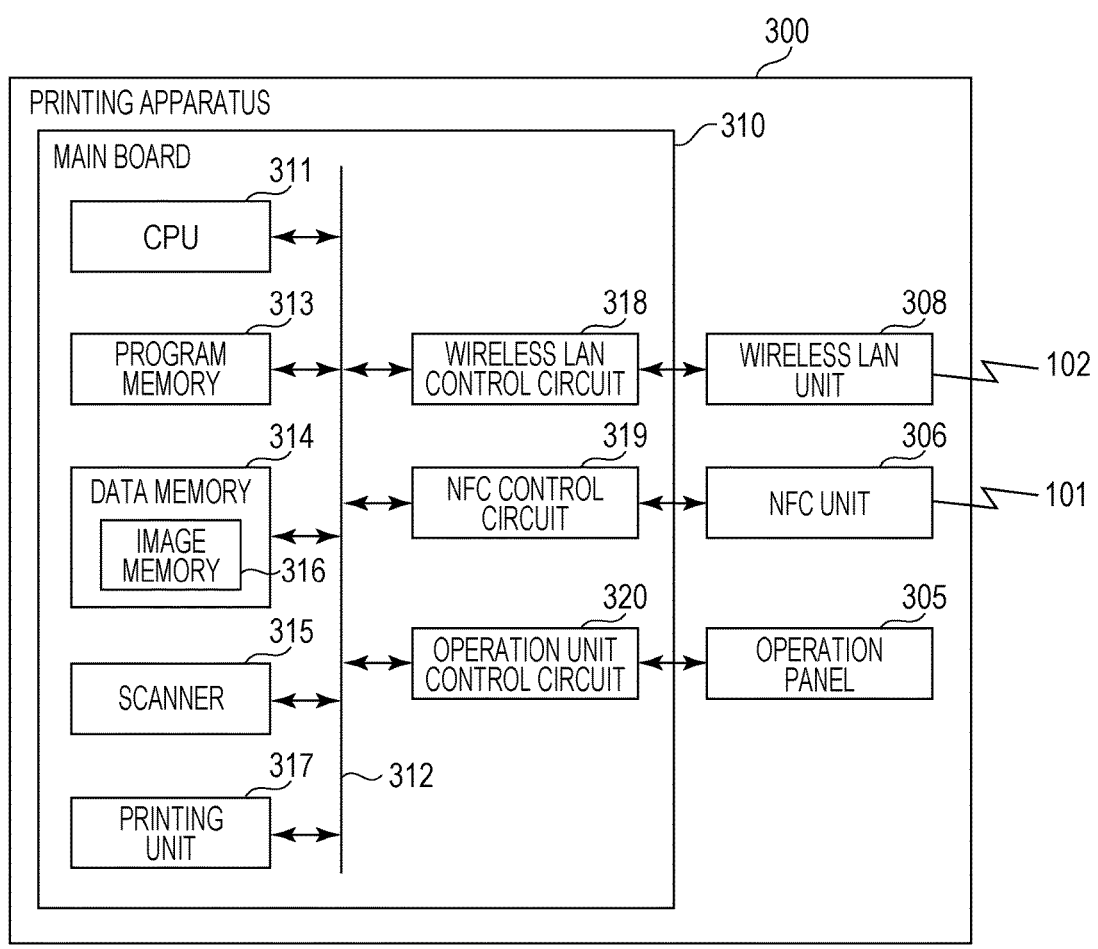
FIG. 5 is a block diagram illustrating an example of a configuration of the printing apparatus.

FIG. 5 is a block diagram illustrating a configuration of a printing apparatus. The printing apparatus 300 includes a main board 310 configured to generally control the apparatus, a wireless LAN unit 308, the NFC unit 306, and the operation display unit 305. Here, a line connection unit 322, the wireless LAN unit 308 and the NFC unit 306 function as a communication unit of the printing apparatus 300.

A CPU 311 configured as a microprocessor and provided in the main board 310 operates in accordance with a control program stored in a program memory 313 configured as a ROM and data in a data memory 314 configured as a RAM. The CPU 311, the program memory 313 and the data memory 314 are connected through an internal bus 312.

The CPU 311 controls a scanner 315 to read a document and store the read data in the image memory 316 in the data memory 314. The CPU 311 controls a printing unit 317 to allow printing of an image in the image memory 316 in the data memory 314 onto a recording medium.

The CPU 311 controls the wireless LAN unit 308 through a wireless LAN control circuit 318 to allow communication between another communication terminal apparatus and the wireless LAN 102. The CPU 311 controls the NFC unit 306 through an NFC control circuit 319 to allow detection of a connection between another NFC terminal and the NFC 101 and transmission/reception of data to/from another NFC terminal. The CPU 311 controls the line connection unit 322 through a line control circuit 321 to allow connection to a telephone network 323 for facsimile communication and data exchange.

The CPU 311 controls an operation display control circuit 320 to allow display of a state of the printing apparatus 300 and display of a function selection menu on the operation display unit 305 and reception of an operation performed by a user.

Figure 6:
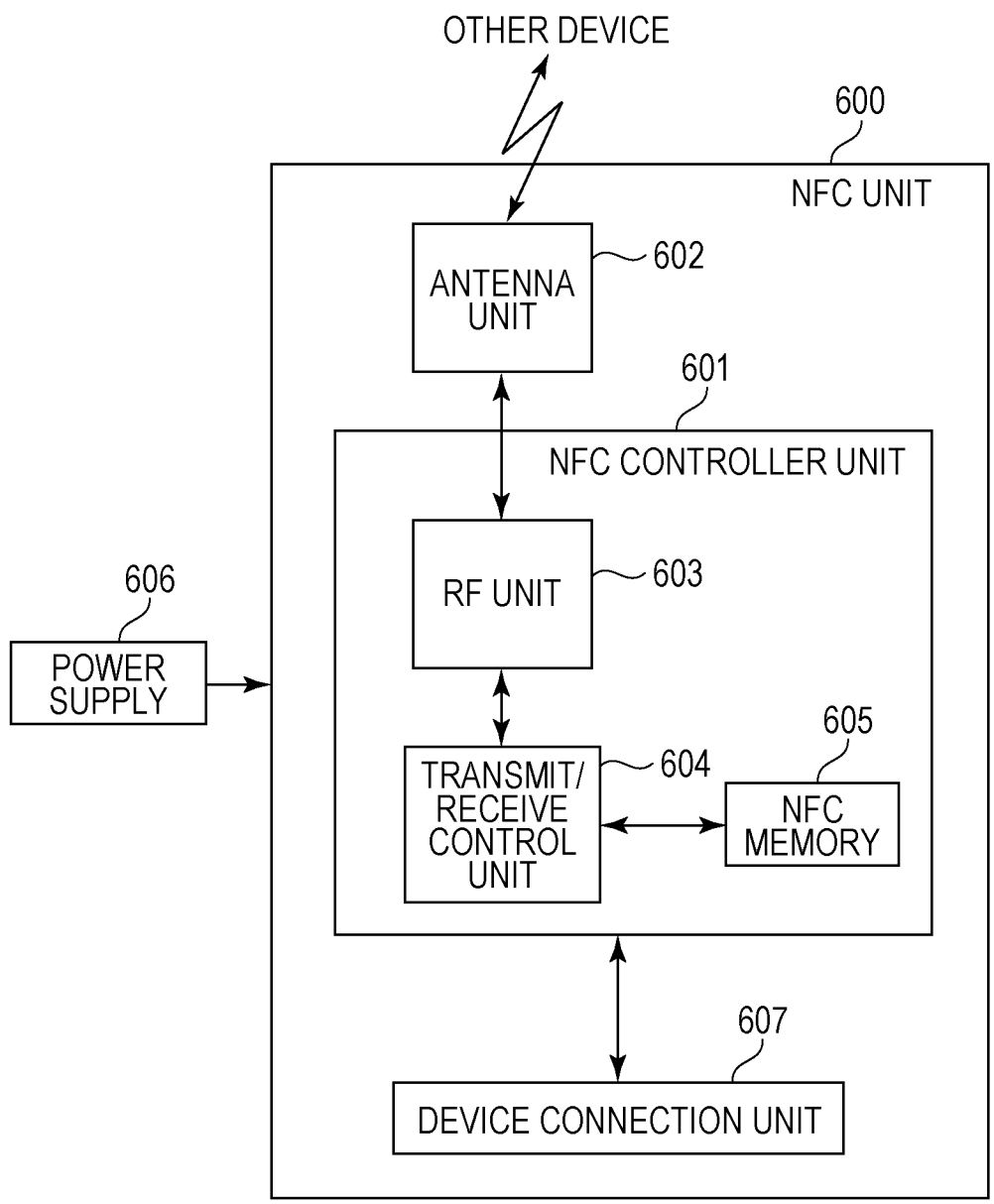
FIG. 6 is a block diagram illustrating an example of a configuration of an NFC unit.

FIG. 6 is a block diagram illustrating details of an NFC unit 600 used in the NFC unit 201 or NFC unit 306.

In an NFC, an apparatus which first outputs an RF (Radio Frequency) field to start a communication is called an initiator in a case where a near field wireless communication is implemented by the NFC unit 600. An apparatus which responds to a command issued by an initiator and performs a communication with the initiator will be called a target.

A passive mode and an active mode will be described. An NFC unit as described above has communication modes including a passive mode and an active mode. In the passive mode, a target responds to a command from an initiator by performing a load modulation. The target does not require power supply. On the other hand, in the active mode, the target responds to a command from an initiator by using an RF field emitted by the target itself. Therefore, the target requires power supply. The active mode has a characteristic of a higher communication speed than the passive mode.

The NFC unit 600 has an NFC controller unit 601, an antenna unit 602, an RF unit 603, a transmit/receive control unit 604, an NFC memory 605, a power supply 606, and a device connection part 607. The antenna unit 602 may receive radio waves from another NFC device and transmit radio waves to another NFC device. The RF unit 603 has a function for modulating and demodulating an analog signal to a digital signal. The RF unit 603 has a synthesizer and identifies frequencies of a band and a channel and controls the band and channel based on frequency allocation data.

The NFC memory 605 may be a non-volatile memory, for example, and accept read and write operations on data stored in the NFC memory 605 even when power is not supplied from the power supply. More specifically, data stored in the NFC memory 605 in the terminal apparatus 200 with no battery remaining amount (or the printing apparatus 300 to which power is not supplied) are read or written by communication in the passive mode of an NFC, for example. The data storage control including data reading and writing from and to the NFC memory 605 is implemented by the NFC controller unit 601.

The transmit/receive control unit 604 performs controls regarding transmission and reception such as assembly/disassembly of transmission/reception frame, preamble addition and detection, a frame identification. The transmit/receive control unit 604 further controls the NFC memory 605 to read and write data and a program therefrom and thereto. In the active mode, the NFC unit 600 receives power through the power supply 606 and may communicate with another NFC device through the device connection part 607 and communicates with another NFC device in a communicable range by using radio waves transmitted and received through the antenna unit 602. In the passive mode, the NFC unit 600 receives radio waves from another NFC device through an antenna and receives power from the other NFC device by electromagnetic induction and communicates with the other NFC device by carrier modulation for data exchange.

An operation for bringing the NFC unit 201 of the terminal apparatus 200 and the NFC unit 306 of the printing apparatus 300 closer will be called an "NFC touch operation".

According to this embodiment, after a user operates the terminal apparatus 200 to select an image to be printed, the user may perform an NFC touch operation on the printing apparatus 300 responsible for printing, and the selected image may be printed by the printing apparatus 300.

Figure 7:
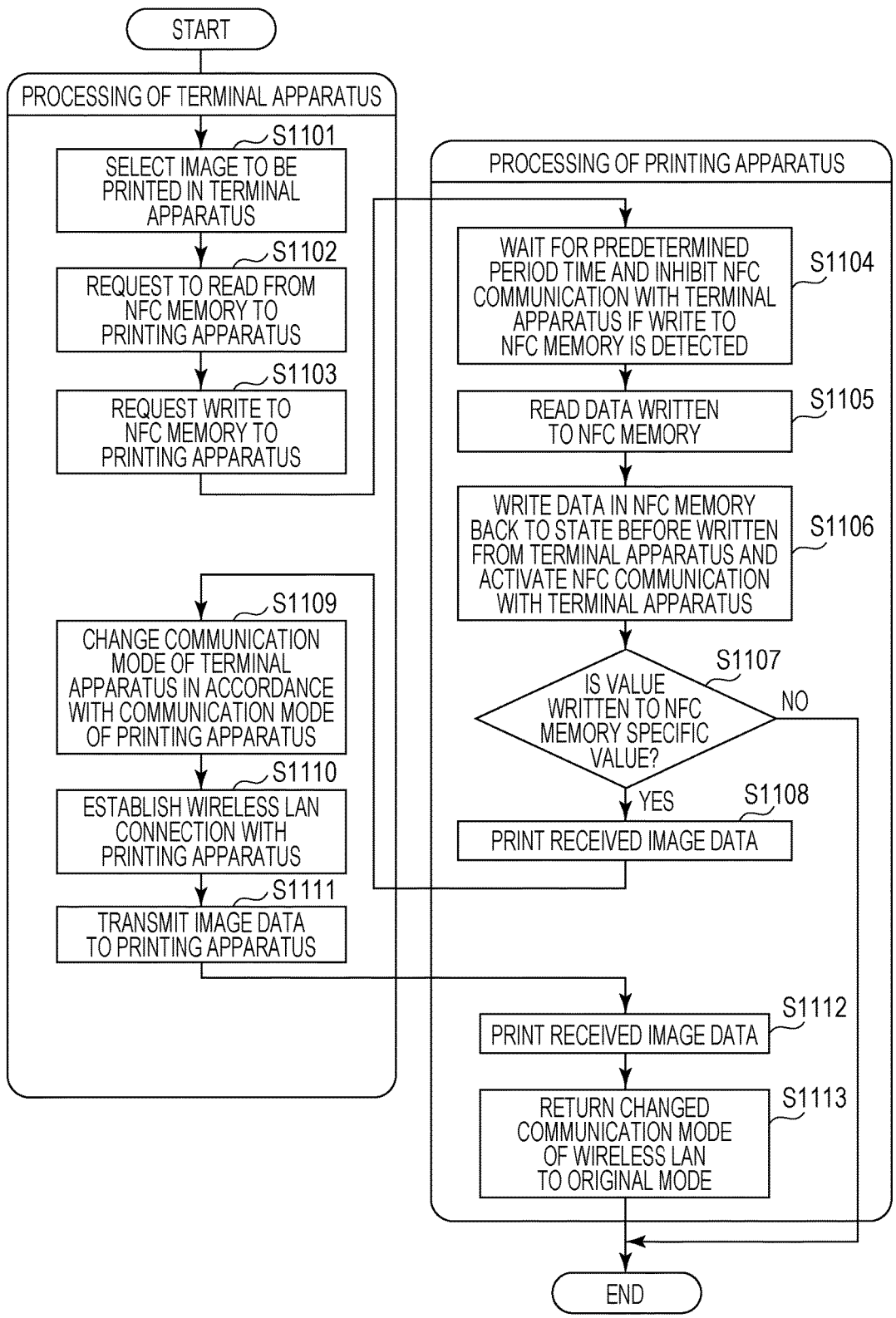
FIG. 7 is a flowchart illustrating details of processing according to a first embodiment.

This embodiment will be described with reference to the flowchart in FIG. 7. The processing flow to be performed by a terminal apparatus according to an embodiment of the present invention is implemented by reading and executing a program relating to the processing flow by the CPU 211 in the terminal apparatus. On the other hand, the processing flow to be performed by a printing apparatus according to an embodiment of the present invention is implemented by reading and executing a program relating to the processing flow by the CPU 311 in the printing apparatus. FIG. 7 illustrates processing for printing in the printing apparatus 300 an image designated in the terminal apparatus 200. FIG. 8 illustrates values in the NFC memory in the printing apparatus 300 before a writing operation is performed from the terminal apparatus 200 to the NFC memory in the printing apparatus 300. The printing apparatus 300 may write values illustrated in FIG. 8 when the printing apparatus 300 is being powered on. FIG. 9 illustrates values to be written from the terminal apparatus 200 to the NFC memory in the printing apparatus 300. The values in FIG. 8 and FIG. 9 are given for illustration of an embodiment of the present invention, and different values from those of FIG. 8 and FIG. 9 may be written.

In step S1101 (where a step will sometimes be simply referred by "S"), the terminal apparatus 200 selects image data in accordance with an operation from the operation unit 204, sets the number of prints and generates a print job. Here, a plurality of image data sets may be selected. Before execution of the processing in S1101, a user activates a print application installed in the terminal apparatus 200, selects image data through a screen of the print application and sets print setting information such as the number of prints, a paper size, and a print direction. In S1101, a print job is generated in accordance with such a user operation. Next, in step S1102, the terminal apparatus 200 requests to read the NFC memory (corresponding to the NFC memory 605 in FIG. 6) within the NFC unit 306 in the printing apparatus 300 in accordance with an NFC touch operation. Communication parameters (such as an SSID and a password) of a printing apparatus necessary for establishing a wireless LAN connection in S1110, which will be described below, are notified from the printing apparatus 300 to the terminal apparatus 200 in accordance with an NFC touch operation in S1102. Apparatus information such as a model name and a type of a printing apparatus may be notified. Here, if the apparatus information of a printing apparatus which supports the print application in the terminal apparatus 200 is not matched with apparatus information acquired by an NFC touch operation (for example, if the model names are not matched), the print application displays an error screen. Then a message that the print processing is not allowed to continue is displayed on the error screen. On the error screen, a message indicating a printing apparatus which supports the print application or a message which suggests use of another print application may be displayed.

After the terminal apparatus 200 reads data in the NFC memory requests to write to the NFC memory to the printing apparatus 300 in step S1103. Next, the terminal apparatus 200 starts writing data to be written to the NFC memory (in FIG. 9 here).

In step S1104, if the printing apparatus 300 detects a write operation to the NFC memory, the printing apparatus 300 waits for a predetermined time period. In other words, the printing apparatus 300 receives the data in FIG. 9 in S1104. The wait operation according to this exemplary embodiment is performed until completion of a write operation to the NFC memory in response to the write request from the terminal apparatus 200 but is not limited to such a purpose. After a lapse of a predetermined time period, the printing apparatus 300 inhibits (inactivates) an NFC with a terminal apparatus. In this case, inhibiting an NFC may allow rewriting data in FIG. 9 written to the NFC memory by different data for prevention of execution of a process intended by a user. For example, in a case where a user brings the terminal apparatus 200 closer to the NFC unit of the printing apparatus 300 for the purpose of shift to the AP mode, which will be described below, the data in FIG. 9 are written to the NFC memory. Here, if data in the NFC memory are written by another terminal apparatus before the printing apparatus stores the data in FIG. 9 to the program memory 313, for example, there is a possibility that the printing apparatus operates in a mode not intended by a user of the terminal apparatus 200. In order to reduce the possibility, an NFC is inhibited temporarily.

In step S1105, the printing apparatus 300 reads data in the NFC memory. The data read in step S1105 are saved in the program memory 313 or data memory 314 within the printing apparatus 300. In other words, according to this exemplary embodiment, the data illustrated in FIG. 9 are saved in the program memory 313 or data memory. In step S1106, the printing apparatus 300 writes (updates) data in the NFC memory back to a state before written from the terminal apparatus 200 and activates an NFC with the terminal apparatus. In other words, the data in the NFC memory is written back to the state of the data illustrated in FIG. 9 to the state of the data illustrated in FIG. 8, and an NFC is activated. The write back processing to the NFC memory and the NFC activation may not be executed at the time point of step S1106. The information to be written back (FIG. 8) is saved in the program memory 313 or data memory 314 in a period from reception of a write request to start of the writing of the data in FIG. 9. Alternatively, the printing apparatus 300 may prestore information to be written back to the NFC memory (or information necessary for reconfiguration of the data illustrated in FIG. 8), and information to be written back to the NFC memory may be collected in S1106, and the collected information may be written back to the NFC memory. In this case, the information (in FIG. 8) to be written back may not be saved.

In step S1107, the printing apparatus 300 checks the data (FIG. 9) saved in the program memory 313 or data memory 314 and written to the NFC memory. If the written values include a specific value as illustrated in FIG. 9, the processing at and after step S1108 may be executed. If not, the processing ends. The expression "specific value" refers to a communication mode switch instruction (AP mode shift instruction in FIG. 9). The AP mode here is a mode in which access points included in a printing apparatus are activated while the terminal apparatus 200 uses the access points of the printing apparatus to exchange by P2P data held in the terminal apparatus 20.

In step S1108, the printing apparatus 300 changes the communication mode of a wireless LAN in accordance with the information written to the NFC memory. At a time of step S1108, if the printing apparatus 300 operates in the communication mode designated in the information written to the NFC memory by the terminal apparatus 200, the communication mode changing processing is not necessary. In other words, referring to the example in FIG. 9, if the printing apparatus is already operating in the AP mode, the change of the communication mode is not necessary. The communication mode to be changed may be determined based on a value as illustrated in FIG. 9 or may be changed to a predetermined communication mode in the printing apparatus 300. According to this exemplary embodiment, because an AP mode change is instructed in FIG. 9, the printing apparatus 300 in S1108 changes to the AP mode (or sets the AP mode) as a wireless LAN communication mode. As illustrated in FIG. 10, the communication mode to be changed may be determined based on a region of the NFC memory of the printing apparatus 300 to which the terminal apparatus 200 writes data. In other words, the information illustrated in FIG. 10 is held in advance in the terminal apparatus 200 and the printing apparatus 300. In a case where, for example, a user of the terminal apparatus 200 inputs an instruction to change to the AP mode, the terminal apparatus 200 writes information to 0x0000 of the NFC memory in accordance with the information in FIG. 10. If information is written to 0x0000 of the NFC memory, the printing apparatus 300 recognizes the instruction to change to the AP mode based on the information in FIG. 10 and changes the communication mode.

In step S1109, the terminal apparatus 200 changes the communication mode of the terminal apparatus 200 in accordance with the communication mode of the printing apparatus 300. According to this exemplary embodiment, because the printing apparatus 300 changes to the AP mode as a wireless LAN communication mode, the communication mode of the terminal apparatus 200 is also changed to the AP mode. If the terminal apparatus 200 and the printing apparatus 300 already have a communicable state, the change of the communication mode of the terminal apparatus 200 is not necessary. In step S1110, the terminal apparatus 200 uses the communication parameters acquired in S1102 to establish a wireless LAN connection with the printing apparatus 300. In step S1111, the terminal apparatus 200 transmits the print job generated in step S1101 to the printing apparatus 300. A print job may be generated at a time point different from S1101 (such as a time point when a connection is established in S1110).

In step S1112, the printing apparatus 300 receives the print job transmitted from the terminal apparatus 200 executes print processing. After the print processing ends in step S1112, the printing apparatus 300 in step S1113 returns the communication mode (AP mode in this example) changed in step S1108 to the communication mode before the change. In a case where the process for writing the data in FIG. 8 to the NFC memory and the activation of an NFC are not executed in step S1106, the processing in S1106 may be executed at this time point (when the processing of a print job completes).

As described above, according to the first embodiment, the terminal apparatus 200 reads data in the NFC memory in the printing apparatus 300 and writes an instruction to change the communication mode to the NFC memory. When the writing to the NFC memory is completed by the terminal apparatus 200 and the written data is saved in the program memory 313 or data memory, the printing apparatus 300 returns the state of the NFC memory to the state before the writing. If the written values instruct to change the communication mode, the printing apparatus 300 changes the communication mode of the printing apparatus 300. In response to the change of the communication mode of the printing apparatus 300, the terminal apparatus 200 establishes a wireless LAN connection with the printing apparatus 300 and transmits a print job to the printing apparatus 300. The printing apparatus 300 executes the received print job, and returns the communication mode to the communication mode before the change upon completion of the execution of the print job. Thus, even a user who does not know the structure of data stored in the NFC memory may change the communication mode of the printing apparatus 300 and establish a communication with a terminal apparatus easily. The communication mode is returned after printing processing is performed by the printing apparatus 300 so that printing may be executed without requiring a user to recognize the change of the communication mode. Furthermore, because information before writing is performed by the terminal apparatus 200 is written back to the NFC memory, information necessary for a user to keep may be held in the NFC memory. For example, communication information such as an SSID and a password of the printing apparatus 300 and device information such as the model name and functions of the printing apparatus 300, which are stored in the NFC memory before written to a terminal apparatus, may be written back to an NFC memory of the printing apparatus 300.

Having described the processing for changing the communication mode to be performed by a printing apparatus in response to writing to an NFC memory according to this embodiment, a processing mode (processing setting) of another printing apparatus may be changed. For example, a printing mode of a printing apparatus may be changed from a normal mode to a power saving mode in response to a writing operation to an NFC memory.

Second Embodiment

According to a second embodiment, a user operates the terminal apparatus 200 to perform an NFC touch operation on the printing apparatus 300 so that the printing apparatus 300 may scan image data.

Components of apparatuses according to this embodiment are equivalent to those of the first embodiment otherwise specified, and the description will be omitted. The first embodiment and the second embodiment may be executed separately or may be executed in combination. Before the processing in S1201 is executed, a user may start a print application installed in the terminal apparatus 200 and sets a scan mode by using a screen of the print application. This allows the print application to recognize that a user is requesting a scan process.

Figure 11:
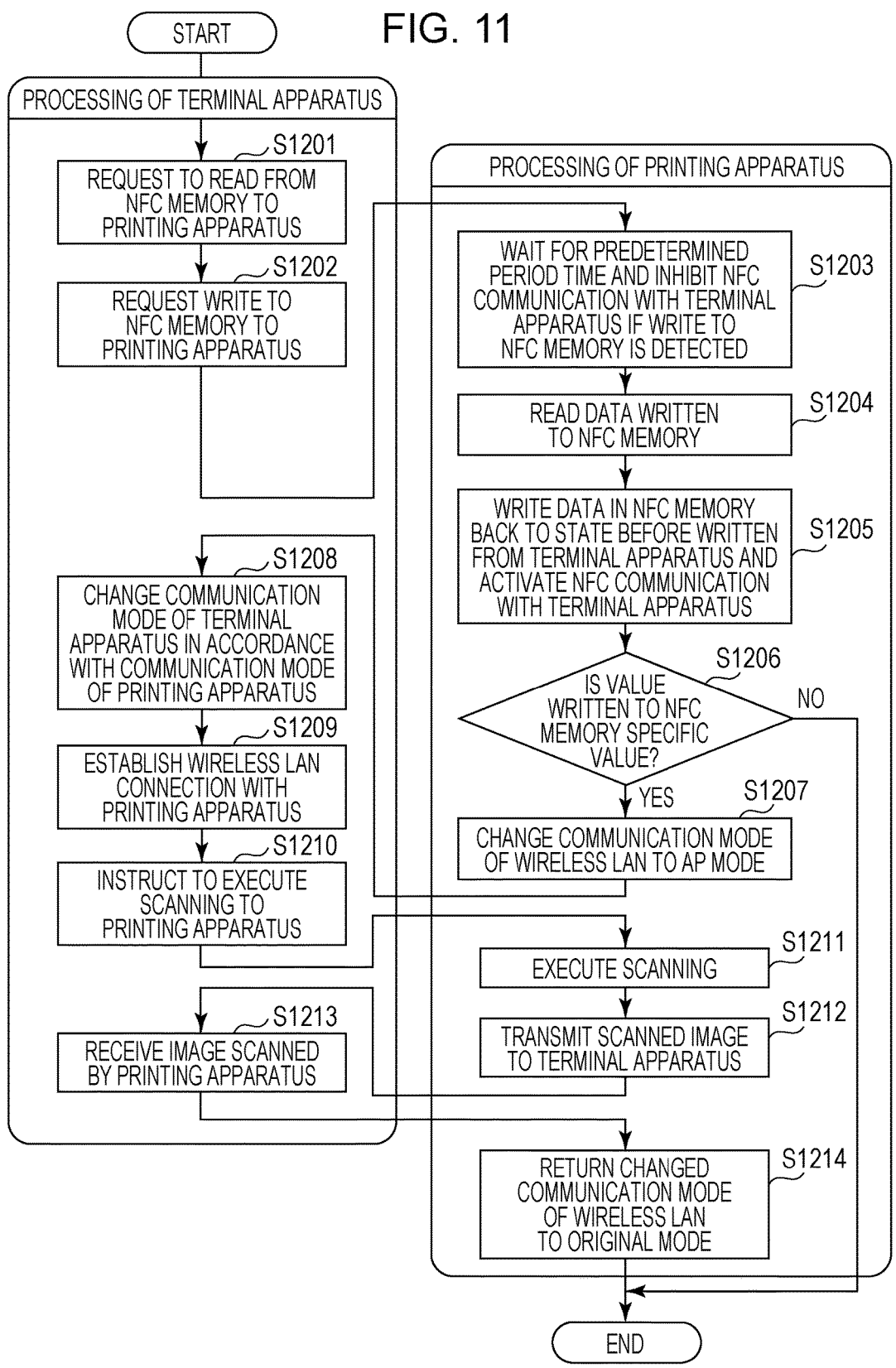
FIG. 11 is a flowchart illustrating details of processing according to a second embodiment.

This embodiment will be described with reference to the flowchart in FIG. 11. Because the processing from step S1201 to step S1202 is the same as the processing from step S1102 to step S1103 in FIG. 7, the description will be omitted. Because the processing from step S1203 to step S1209 is the same as the processing from step S1104 to step S1110 in FIG. 7, the description will be omitted. Because the processing in step S1214 is the same as the processing in step S1113 in FIG. 7, the description will be omitted. Communication parameters (such as an SSID and a password) of the printing apparatus necessary for establishment of a wireless LAN connection in S1209, which will be described below are notified from the printing apparatus 300 to the terminal apparatus 200 in response to the NFC touch operation in S1202. Here, device information describing a function of the printing apparatus may be notified instead. If the device information describes that the printing apparatus having received the touch operation is not capable of executing a scan function, the print application displays an error screen to display a message that the scan process is unable to continue. The error screen may display a message indicating a printing apparatus capable of executing the scan, a message suggesting to use another print application, or the like. In step S1210, the terminal apparatus 200 instructs to execute the scan process to the printing apparatus 300.

The printing apparatus 300 in step S1211 in response to the instruction to execute the scan process from the terminal apparatus 200 scans a document placed on a document platen to acquire image data. When the scan process completes, the printing apparatus 300 transmits the image data acquired by the scan process to the terminal apparatus 200 through the wireless LAN connection established in S1209 (S1212).

The terminal apparatus 200 in step S1213 receives the image data transmitted from the printing apparatus 300.

As described above, according to the second embodiment, the terminal apparatus 200 reads data in the NFC memory in the printing apparatus 300 and writes it to the NFC memory to instruct to change its communication mode. The printing apparatus 300 in response to the writing to the NFC memory writes the data in the NFC memory to the data before the writing. If the written value instructs to change the communication mode, the communication mode of the printing apparatus 300 is changed. The terminal apparatus 200 in response to the change of the communication mode of the printing apparatus 300 establishes a wireless LAN connection with the printing apparatus 300 and instructs to execute to scan the image data. The printing apparatus 300 execute scanning and transmits the image data acquired by the scanning to the terminal apparatus. The printing apparatus 300 returns the communication mode to the communication mode before the change upon completion of a series of operations of the scanning. Thus, even a user who does not know the structure of data stored in the NFC memory may change the communication mode of the printing apparatus 300 and establish a communication with a terminal apparatus easily. The communication mode is returned after printing processing is performed by the printing apparatus 300 so that scanning may be executed without requiring a user to recognize the change of the communication mode.

Third Embodiment

According to a third embodiment, a user operates the terminal apparatus 200 to perform an NFC touch operation on the printing apparatus 300 so that information which is not saved in an NFC memory of the printing apparatus 300 when the touch operation is performed may be read by the terminal apparatus 200. More specifically, because the NFC memory has a small storage capacity, there is a possibility that all of information necessary for the terminal apparatus 200 may not be held in the NFC memory. Therefore, information required by an application running in the terminal apparatus 200 in which the touch operation is performed may not possibly be stored in the NFC memory of the printing apparatus 300 even though the information is held in a program memory or a data memory. Accordingly, the printing apparatus 300 writes the information required by the terminal apparatus 200 in association with the touch operation into the NFC memory so that information which is not saved in the NFC memory when the touch operation is performed may be allowed to be read by the terminal apparatus.

Components of apparatuses according to this embodiment are equivalent to those of the first or second embodiment otherwise specified, and the description will be omitted. The first to third embodiments may be executed separately or may be executed in combination.

Figure 12:
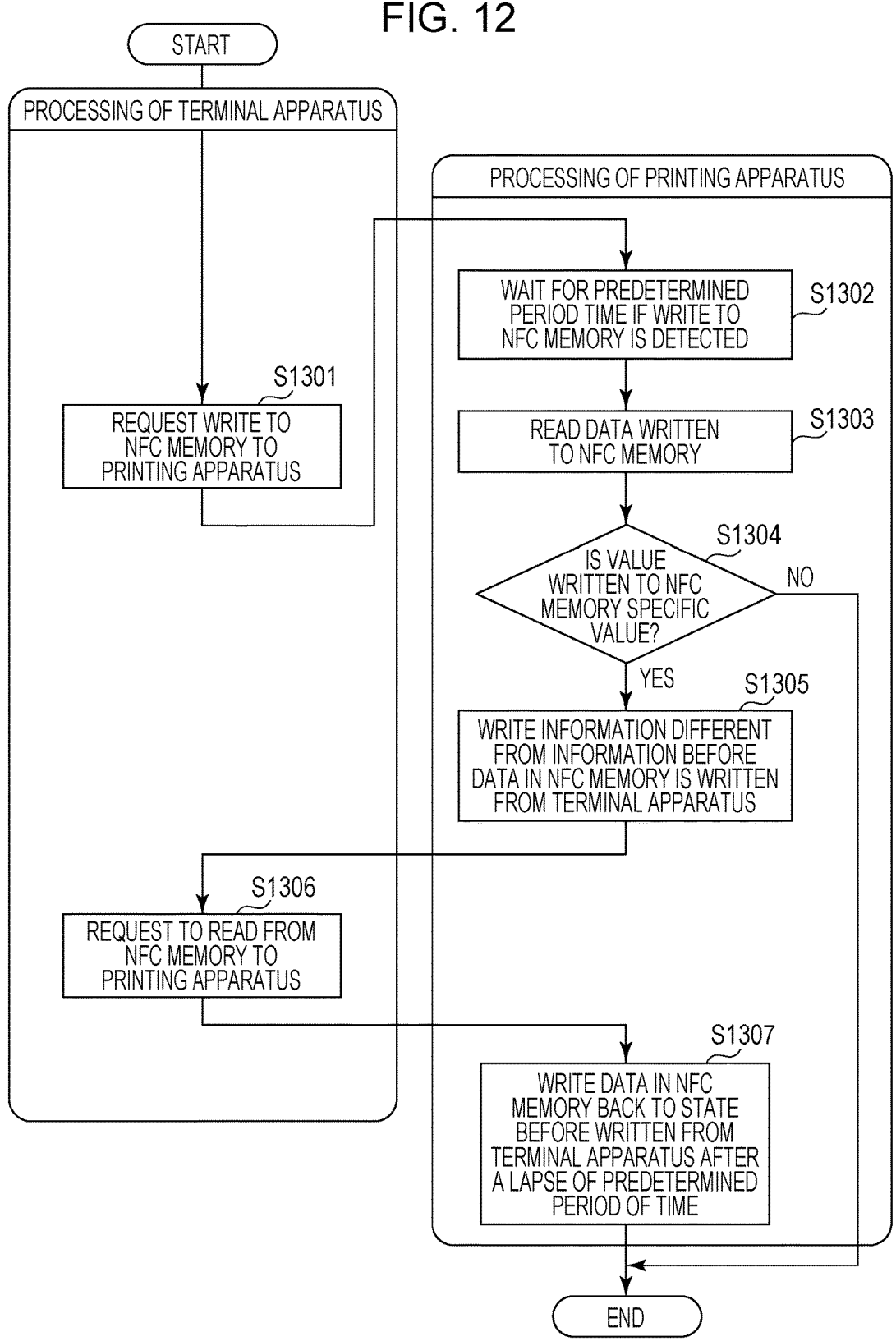
FIG. 12 is a flowchart illustrating details of processing according to a third embodiment.

The third embodiment will be described with reference to a flowchart in FIG. 12. Because the processing from step S1301 to step S1303 is the same as the processing from step S1103 to step S1105 in FIG. 7, the description will be omitted.

In step S1304, the terminal apparatus 200 determines whether information written to the NFC memory includes a specific value or not. Examples of such a specific value may include information of an activated application. Examples of such a specific value may further include a data type to be read by the terminal apparatus 200 through an NFC touch operation.

If the terminal apparatus 200 determines that the specific value is included in S1304, the printing apparatus 300 in step S1305 writes, to the NFC memory, information different from information before the terminal apparatus 200 writes. For example, it is assumed that the NFC memory holds data in FIG. 8 before the terminal apparatus 200 is touched. Here, the printing apparatus 300 retrieves information in FIG. 13 as information to be written to the NFC memory based on a specific value written to the NFC memory in accordance with a NFC touch operation in the terminal apparatus 200 from a program memory and a data memory and writes them to the NFC memory.

In step S1306, the terminal apparatus 200 notifies a read request to read information (FIG. 13) because the information requested by the terminal apparatus 200 is written to the NFC memory of the printing apparatus. Then, the terminal apparatus 200 reads the information in FIG. 13 from the NFC memory of the printing apparatus.

In step S1307, after a lapse of a predetermined time period, the printing apparatus 300 performs a write-back operation such that the data in the NFC memory is be the same as the state before the terminal apparatus 200 performs the writing operation. In other words, the printing apparatus 300 writes the data in the NFC memory back from the state of information in FIG. 13 to the state of information in FIG. 8.

As described above, according to the third embodiment, the terminal apparatus 200 executes a writing operation on the NFC memory of the printing apparatus 300. The printing apparatus 300 rewrites a data in the NFC memory to information required by the terminal apparatus in response to the writing operation on the NFC memory. The terminal apparatus 200 reads the data in the NFC memory of the printing apparatus 300. After a lapse of a predetermined time period, the printing apparatus 300 performs a write-back operation such that data in the NFC memory may be the same as the data before the terminal apparatus 200 performs the writing operation. Thus, the terminal apparatus 200 is allowed to read even information which is not saved in the NFC memory due to a limited capacity or other problems.

According to the present invention, an RFID may be used to change a processing mode of a communication apparatus, and a process intended by a user may be executed in the communication apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

I claim:

1. A communication apparatus comprising:
    at least one processor that operates to control:
    a first wireless communication unit having a memory, the first wireless communication unit configured to
        communicate with an external apparatus by near field wireless communication;
        store, in the memory, first information including communication information for establishing longer field wireless communication having a communication range longer than a range of the near field wireless communication and which is read by the external apparatus, wherein the first information is deleted from the memory if second information including setting information for activating an access point included in the communication apparatus is written to the memory;
        receive a request for writing the second information from the external apparatus; and
        store, in the memory, the second information, wherein the second information is stored in the memory after the request is received from the external apparatus;
    a setting unit configured to activate the access point included in the communication apparatus, if the first information stored in the memory is deleted from the memory and the second information is written to the memory based on the request received from the external apparatus;
    a second wireless communication unit configured to communicate with the external apparatus which has read the first information by the longer field wireless communication if the access point is activated; and an update unit configured to update, after the first information is deleted from the memory by writing the second information to the memory, the memory from a state where the second information is stored in the memory to a state where the first information is stored in the memory.

2. The communication apparatus according to claim 1, wherein, before the communication using the second wireless communication unit is performed, the memory is updated from the state where the second information is stored in the memory to the state where the first information is stored in the memory.

3. The communication apparatus according to claim 1, wherein, in the case where the first information stored in the memory is deleted from the memory by writing the second information to the memory, the wireless communication using the first wireless communication unit is inactivated until the second information is recognized by the communication apparatus.

4. The communication apparatus according to claim 1, wherein, in a case where the request is received from the external apparatus, the at least one processor saves the first information in a different memory that is different from the memory of the first wireless communication unit, and wherein the memory of the first wireless communication unit is updated from the state where the second information is stored in the memory to the state where the first information having been saved in the different memory is stored in the memory.

5. The communication apparatus according to claim 1, wherein the memory is updated from the state where the second information is stored in the memory to the state where the first information acquired from a different memory that is different from the memory of the first wireless communication unit is stored in the memory.

6. The communication apparatus according to claim 1, wherein the first information includes any one of an SSID, a password of the communication apparatus, a model name of the communication apparatus, functions of the communication apparatus, and MAC address of the communication apparatus.

7. The communication apparatus according to claim 1, wherein the communication apparatus further comprises at least a first surface which includes the first wireless communication unit, and a second surface which includes a document platen, and wherein an angle between the first surface and the second surface is changeable.

8. The communication apparatus according to claim 1, wherein the first wireless communication unit is provided on a surface of the communication apparatus that is different from a surface of the communication apparatus that is substantially perpendicular to an undersurface of the communication apparatus.

9. The communication apparatus according to claim 1, wherein the at least one processor further controls a printing unit configured to perform printing based on information received from the external apparatus by the longer field wireless communication.

10. The communication apparatus according to claim 1, wherein the second information is stored in the memory after the first information is read by the external apparatus.

11. The communication apparatus according to claim 1, wherein the access point is activated without receiving a user operation by the communication apparatus or the external apparatus, after a user operation which is received by the external apparatus before communication with the communication apparatus by the near field wireless communication.

12. The communication apparatus according to claim 1, wherein the second information is written to the memory in NDEF.

13. A control method executed by a communication apparatus comprising a first wireless communication unit having a memory and configured to communicate with an external apparatus by near fired wireless communication, which stores, in the memory, first information including communication information for establishing longer field wireless communication having a communication range longer than a range of the near field wireless communication and which is read by the external apparatus, wherein the first information is deleted from the memory if second information including setting information for activating an access point included in the communication apparatus is written to the memory, which receives a request for writing the second information from the external apparatus and which stores, in the memory, the second information, wherein the second information is stored in the memory after the request is received from the external apparatus, and a second wireless communication unit configured to communicate with the external apparatus which has read the first information by the longer field wireless communication if the access point is activated, the control method comprising:

activating the access point included in the communication apparatus if the first information stored in the memory is deleted from the memory and the second information is written to the memory based on the request received from the external apparatus; and updating, after the first information is deleted from the memory by writing the second information to the memory, the memory from a state where the second information is stored in the memory to a state where the first information is stored in the memory.

14. The control method according to claim 13, wherein, before the communication using the second wireless communication unit is performed, the memory is updated from the state where the second information is stored in the memory to the state where the first information is stored in the memory.

15. The control method according to claim 13, wherein, in the case where the first information stored in the memory is deleted from the memory by writing the second information to the memory, the wireless communication using the first wireless communication unit is inactivated until the second information is recognized by the communication apparatus.

16. The control method according to claim 13, further comprising:

in a case where the request is received from the external apparatus, saving the first information in a different memory that is different from the memory of the first wireless communication unit, wherein the memory of the first wireless communication unit is updated from the state where the second information is stored in the memory to the state where the first information having been saved in the different memory is stored in the memory.

17. The control method according to claim 13, wherein the memory is updated from the state where the second information is stored in the memory to the state where the first information acquired from a different memory that is different from the memory of the first wireless communication unit is stored in the memory.

18. The control method according to claim 13, wherein the first information includes any one of an SSID, a password of the communication apparatus, a model name of the communication apparatus, functions of the communication apparatus, and MAC address of the communication apparatus.

19. The control method according to claim 13, wherein the communication apparatus further comprises at least a first surface which includes the first wireless communication unit, and a second surface which includes a document platen, and
   wherein an angle between the first surface and the second surface is changeable.

20. The control method according to claim 13, wherein the first wireless communication unit is provided on a surface of the communication apparatus that is different from a surface of the communication apparatus that is substantially perpendicular to an undersurface of the communication apparatus.

21. The control method according to claim 13, further comprising performing printing based on information received from the external apparatus by the longer field wireless communication.

22. The control method according to claim 13, wherein the second information is stored in the memory after the first information is read by the external apparatus.

23. The control method according to claim 13, wherein the access point is activated without receiving a user operation by the communication apparatus or the external apparatus, after a user operation which is received by the external apparatus before communication with the communication apparatus by the near field wireless communication.

24. The control method according to claim 13, wherein the second information is written to the memory in NDEF.

* * * * *